United States Patent
Godkin (10) Patent No.: US 6,787,943 B2
(45) Date of Patent: Sep. 7, 2004

(54) LINEAR VOICE COIL ACTUATOR WITH PLANAR COILS

(75) Inventor: Mikhail Godkin, San Diego, CA (US)

(73) Assignee: Bei Technologies, Inc., San Francisco, CA (US)

( * ) Notice: Subject to any disclaimer, the term of this patent is extended or adjusted under 35 U.S.C. 154(b) by 0 days.

(21) Appl. No.: 10/327,316

(22) Filed: Dec. 20, 2002

(65) Prior Publication Data

US 2003/0127916 A1 Jul. 10, 2003

Related U.S. Application Data

(60) Provisional application No. 60/343,488, filed on Dec. 21, 2001.

(51) Int. Cl.[7] ............................................. H02K 41/00
(52) U.S. Cl. ........................................................ 310/12
(58) Field of Search .............................. 360/264.7–265, 360/266.4, 266.7–266.9; 310/12–14

(56) References Cited

U.S. PATENT DOCUMENTS

| | | | |
|---|---|---|---|
| 4,318,038 A | | 3/1982 | Munehiro .................. 310/13 X |
| 4,758,750 A | | 7/1988 | Itagaki et al. .................. 310/13 |
| 4,808,955 A | | 2/1989 | Godkin et al. ............. 310/13 X |
| 5,345,206 A | * | 9/1994 | Morcos ....................... 335/222 |
| 6,040,642 A | * | 3/2000 | Ishiyama ..................... 310/12 |
| 6,549,380 B2 | * | 4/2003 | Kazmierczak ........... 360/264.8 |
| 6,590,355 B1 | * | 7/2003 | Kikuchi et al. ............. 318/135 |

OTHER PUBLICATIONS

International Search Report for PCT/US02/40796 mailed May 12, 2003.

* cited by examiner

*Primary Examiner*—Thanh Lam
*Assistant Examiner*—Judson H. Jones
(74) *Attorney, Agent, or Firm*—Gray Cary Ware & Freidenrich LLP (57) ABSTRACT

A linear voice coil actuator is disclosed which includes field subassemblies each including a field blank, and in which at least a one of the field subassemblies includes magnets of alternating polarity positioned on the field blank to form interleaved-magnetic circuits in a direction of motion of the linear voice coil actuator. The field subassemblies are positioned with respect to one another to form a gap between the field subassembly having the magnets, and another of the field subassemblies. Also included is a coil assembly that includes coils positioned in a plane within the gap, wherein the plane is substantially parallel to the direction of motion of the linear voice coil actuator. The field blanks include flux path sections which provide a flux path perpendicular to the direction of motion for each pair of magnets of opposite polarity that are separated by the gap, and which thereby results in the height of the actuator of the present invention being largely independent of the lengths of the magnets employed.

20 Claims, 6 Drawing Sheets

(PRIOR ART – USP 4,808,955 – FIG.5)

FIG. 6

(PRIOR ART – USP 4,808,955 – FIG.7)

FIG. 7

LINEAR VOICE COIL ACTUATOR WITH PLANAR COILS

RELATED APPLICATIONS

The present application claims priority under 35 U.S.C. §119(e) from provisional application No. 60/343,488, filed Dec. 21, 2001.

TECHNICAL FIELD

The present invention is generally directed to linear voice coil actuators, and in particular to a linear voice coil actuator with planar coils.

BACKGROUND ART

Figure 6:
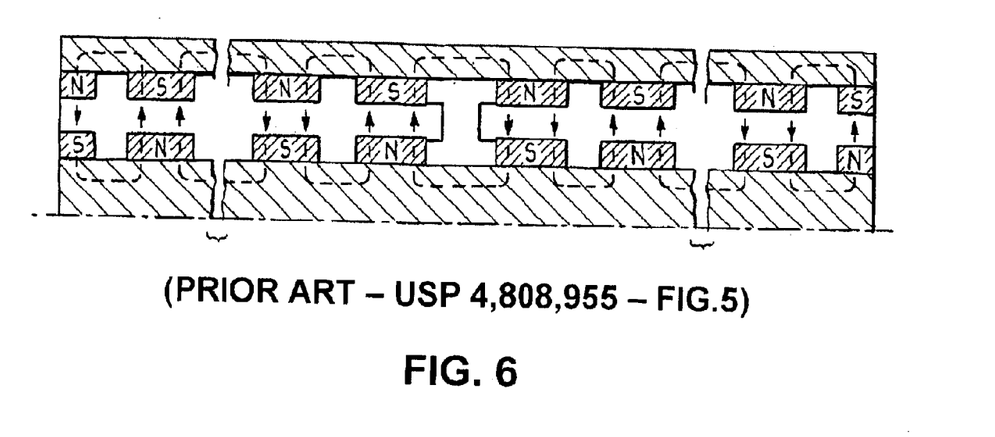
FIGS. 6 and 7 are reproductions of FIGS. 5 and 7, respectively, from U.S. Pat. No. 4,808,955.
Figure 7:
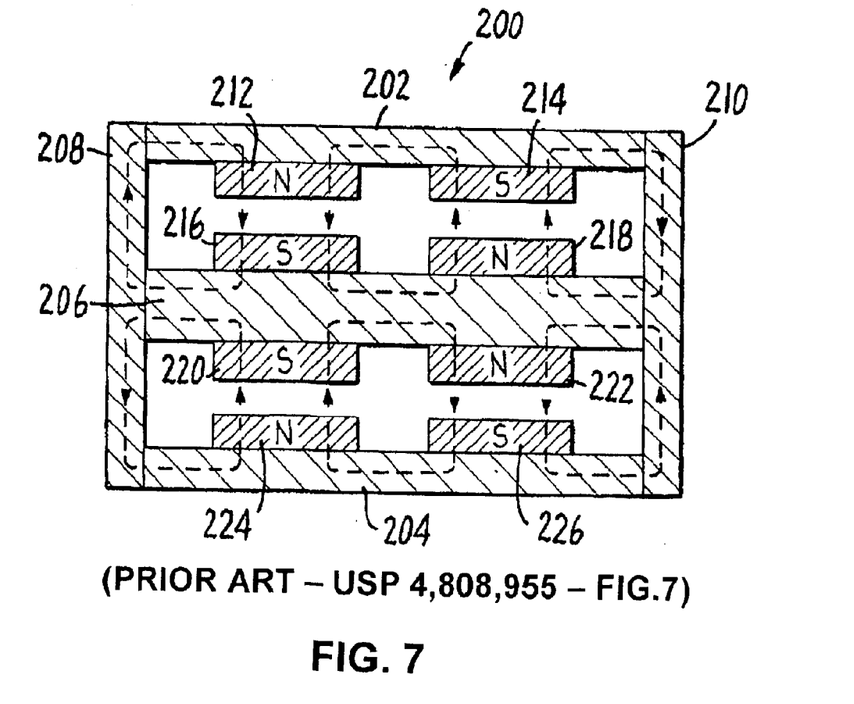

Two different variations of a moving coil linear actuator with interleaved magnetic circuits that are disclosed in U.S. Pat. No. 4,808,955, issued to BEI Electronics, Inc., are depicted in FIG. 5 and FIG. 7 of that patent. These figures are reproduced as FIGS. 6 and 7 of the present application. A field assembly of such an actuator consists of a plurality of magnets of alternating polarity and of the same or different widths in the direction of motion that are attached to the field blanks (return paths), and a plurality of individual coils located in the cavities between the magnets.

A disadvantage of the above design is that the height of the resulting actuator is large.

SUMMARY OF THE INVENTION

The above and other disadvantages of prior moving coil actuators are overcome by the present invention of a linear voice coil actuator including a plurality of field subassemblies each comprising a field blank, wherein at least a first one of the plurality of field subassemblies includes a plurality of magnets of alternating polarity positioned on the field blank to form interleaved-magnetic circuits in a direction of motion of the linear voice coil actuator; and further wherein the plurality of field subassemblies are positioned with respect to one another to form a gap between the first one of the plurality of field subassemblies which includes the plurality of magnets, and another of the plurality of field subassemblies, and a coil assembly that includes coils positioned in a plane within the gap, wherein the plane is substantially parallel to the direction of motion of the linear voice coil actuator.

The magnets of alternating polarity can have the same or different widths in the direction of motion, and the magnets may be spaced apart or in contact with one another.

The field blanks may further include flux path sections positioned to provide, for each of the magnets of the first one of the plurality of field subassemblies and a corresponding portion of a field blank of another one of the plurality of field subassemblies positioned across the gap from the magnet, a flux path through the field blanks perpendicular to the direction of motion of the linear voice coil actuator.

In one of the embodiments of the present invention, first and second ones of the plurality of field subassemblies each include the plurality of magnets of alternating polarities, so that pairs of magnets of opposite polarity from the first and second ones of the plurality of subassemblies are separated by the gap, and further wherein the field blanks further include flux path sections positioned to provide, for each of the pairs of magnets of opposite polarity that are separated by the gap, a flux path through the field blanks perpendicular to the direction of motion of the linear voice coil actuator.

It has been discovered that the inclusion of these above mentioned flux path sections permits the height of the actuator of the present invention to be largely independent of the length of the magnets which are employed. Unlike the previous actuator structures which would typically require an increase in back iron width to accommodate an increase in magnet length in the direction of motion, the present invention does not.

As will be appreciated by those skilled in the art, the above structure can provide an actuator having a substantially reduced height.

These and other advantages and features of the present invention will be more readily understood upon consideration of the following detailed description of certain preferred embodiments of the invention and the accompanying drawings.

DETAILED DESCRIPTION OF THE PRESENT INVENTION

Figure 1:
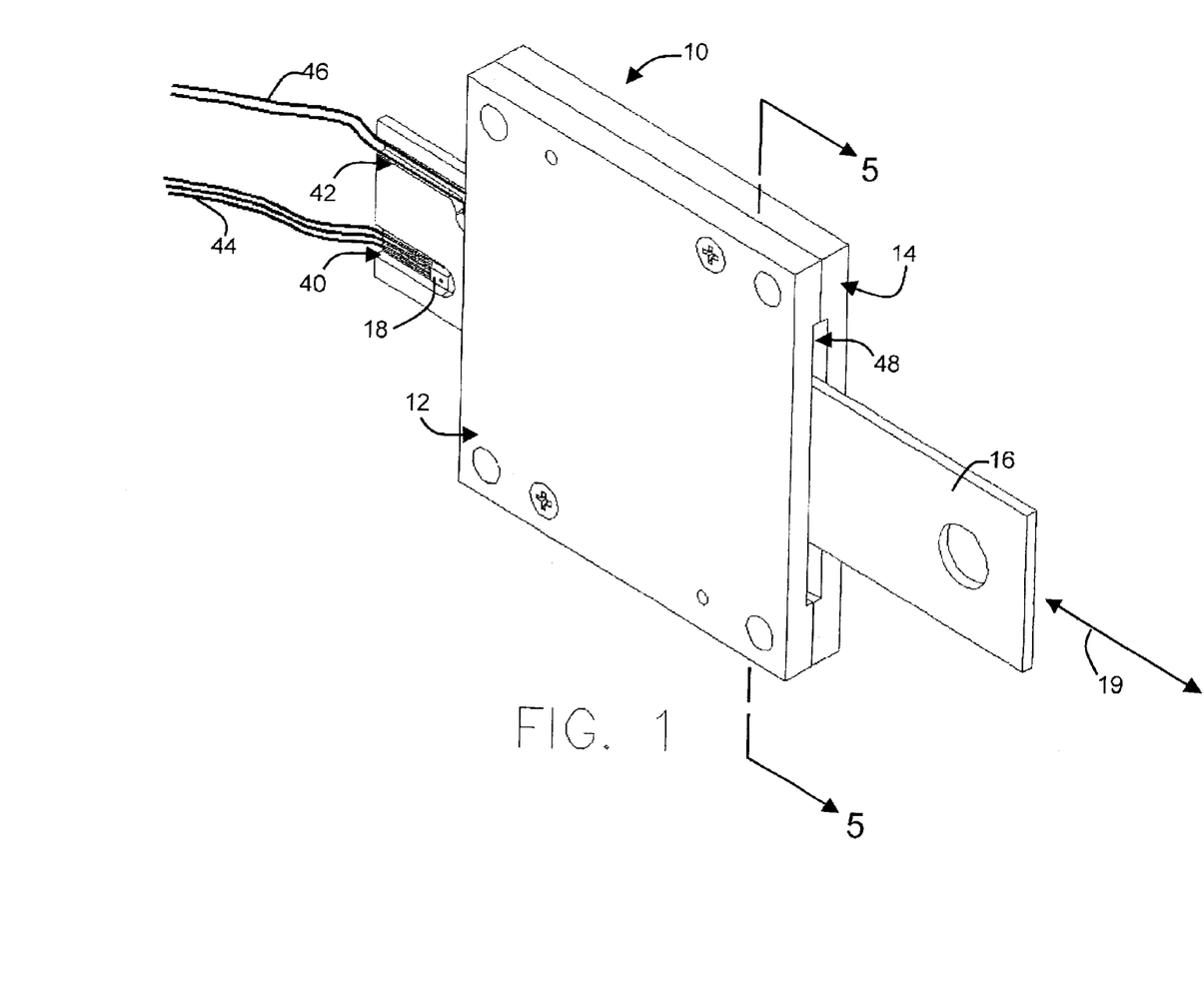
FIG. 1 is a perspective view of one embodiment of a linear voice coil actuator in accordance with present invention.
Figure 2:
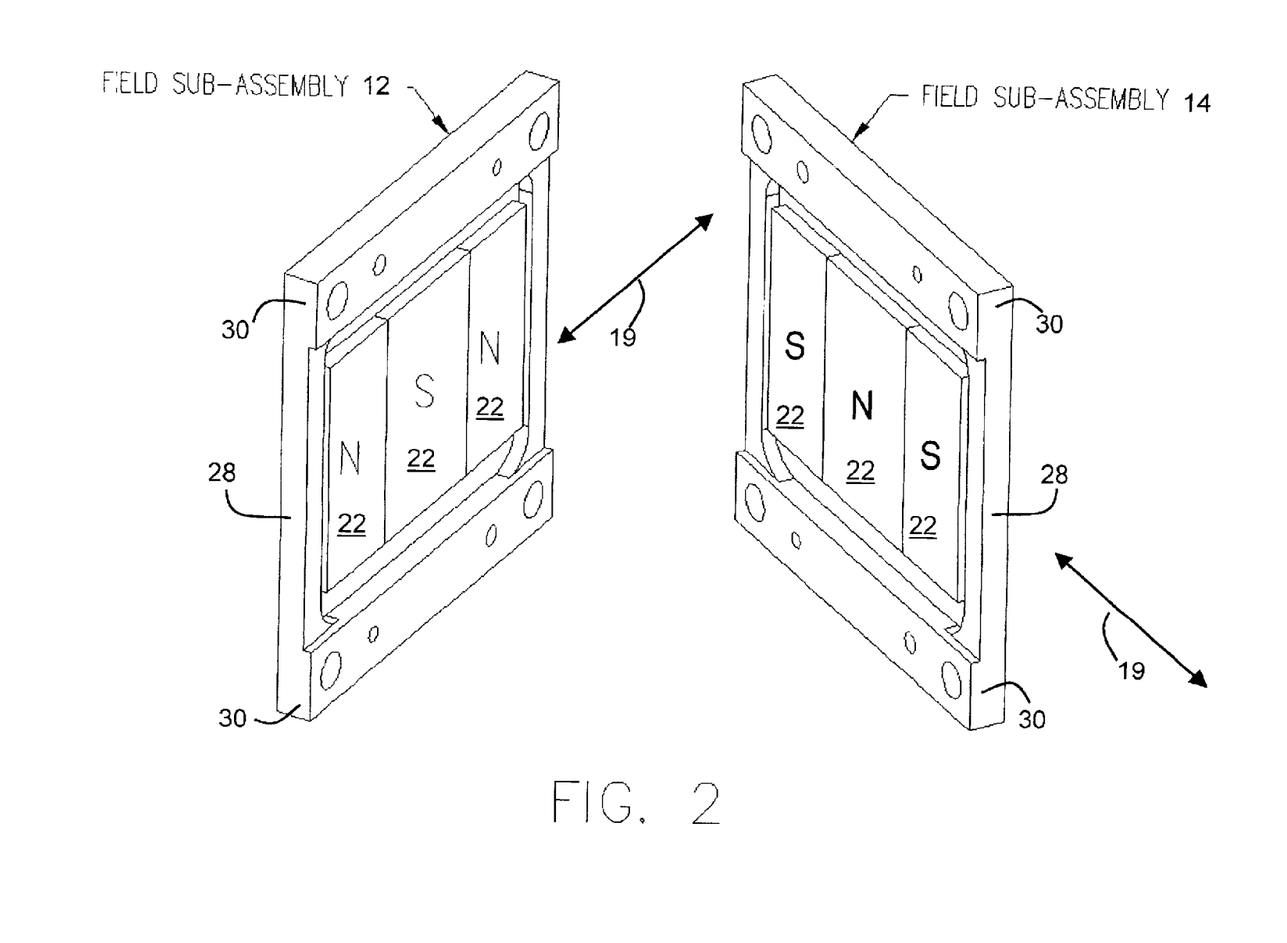
FIG. 2 is a simplified illustration of two field subassemblies of the embodiment of the present invention of FIG. 1.
Figure 3:
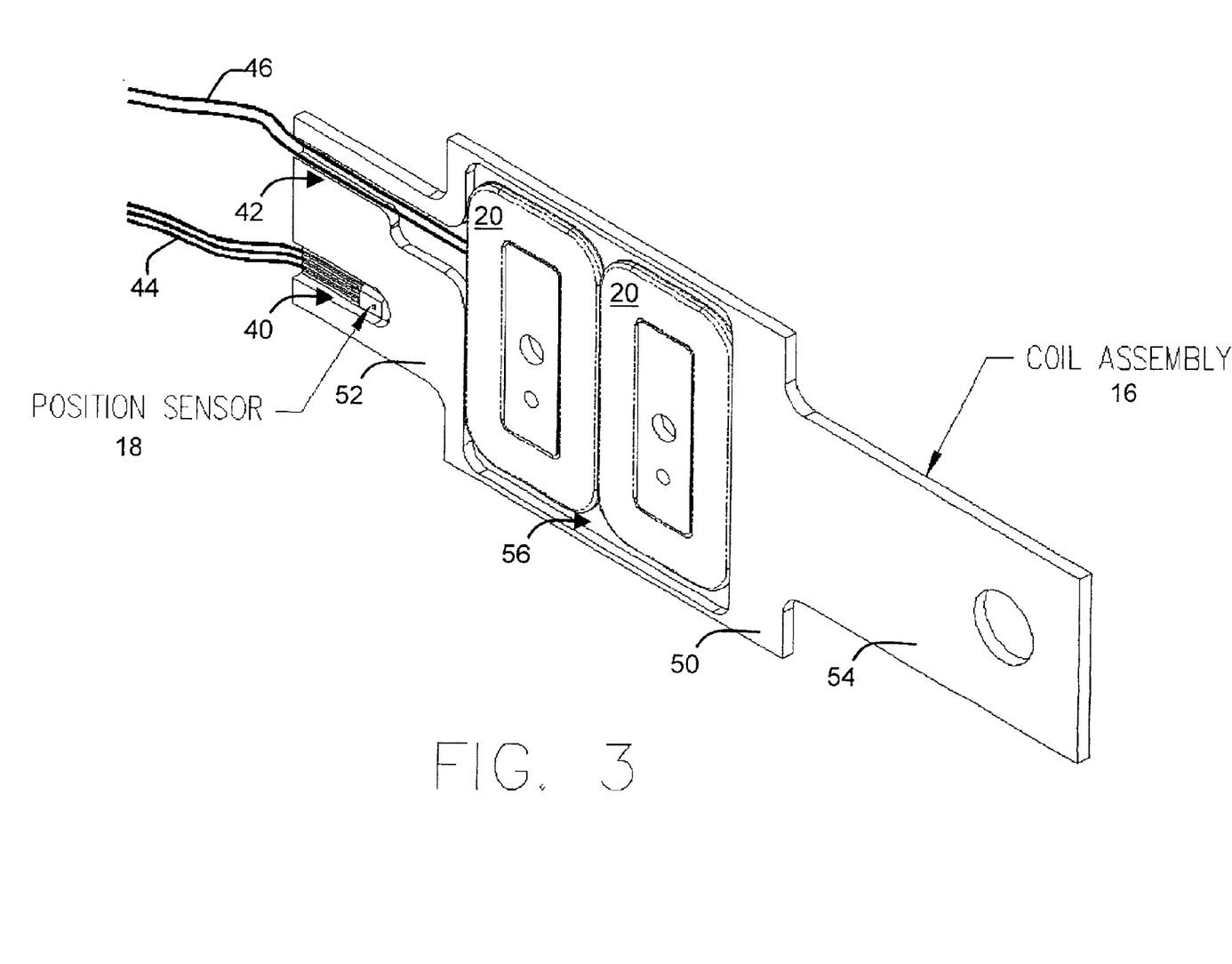
FIG. 3 is a simplified illustration of the coil assembly of the embodiment of the present invention of FIG. 1.

Referring now to FIGS. 1, 2 and 3, the linear voice coil actuator 10 of the subject application includes two field subassemblies 12, 14, and a coil assembly 16 with a position sensor 18. It is analogous to an actuator described in the above referenced U.S. Pat. No. 4,808,955, incorporated herein by reference, but differs in at least the following two aspects.

Figure 4:
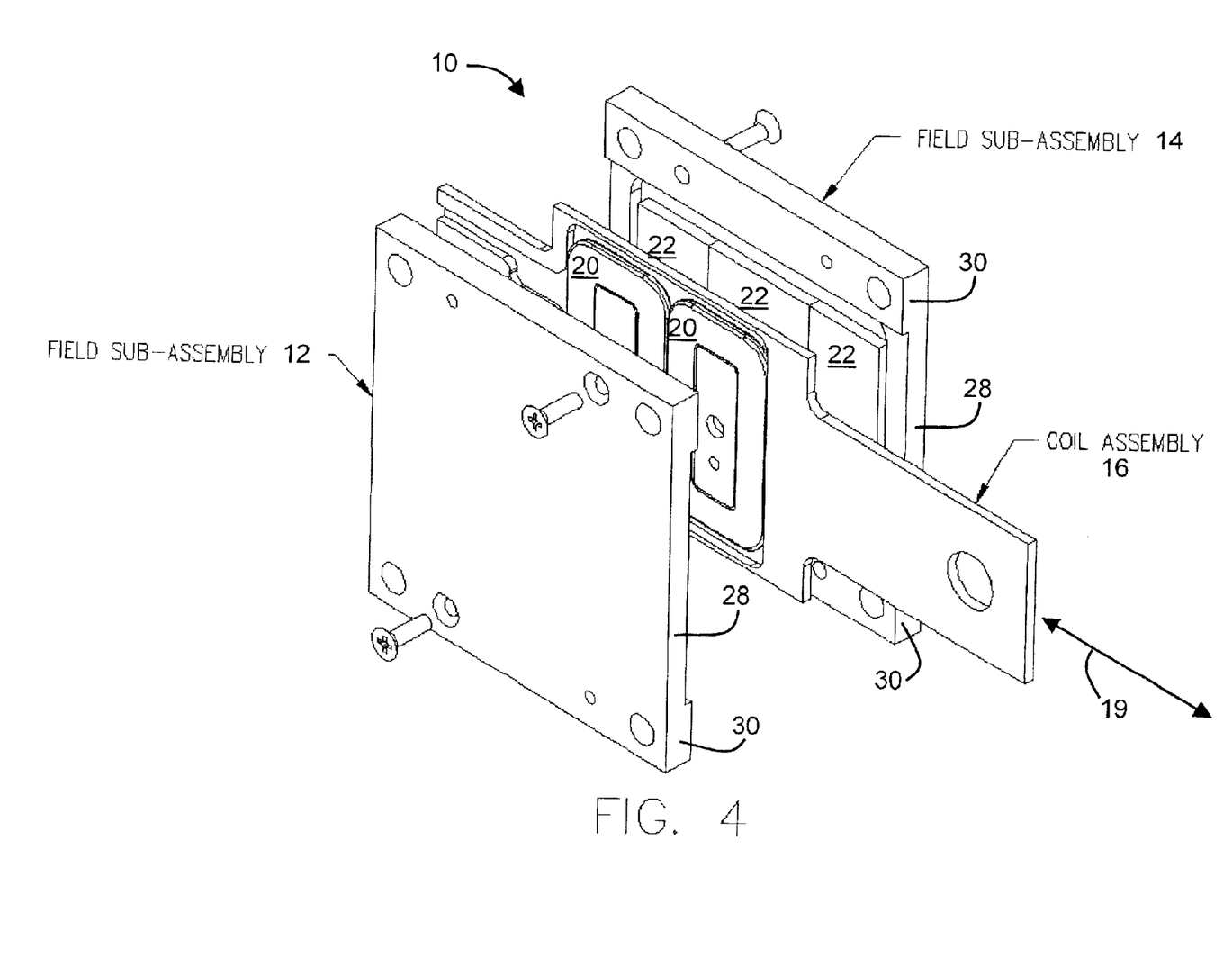
FIG. 4 is a simplified illustration an exploded view of the two field subassemblies and coil assembly of the embodiment of the present invention of FIG. 1.

1) According to the above U.S. Pat. No. 4,808,955, the coils are wound around a core or around the magnets attached to the core, so that the windings positioned in planes that are transverse to the direction of motion. According to the subject application, as seen in the embodiment of FIG. 4, all the coils 20 are located in the same plane between two rows of magnets 22, and the plane is parallel to the direction of motion 19.

Figure 5:
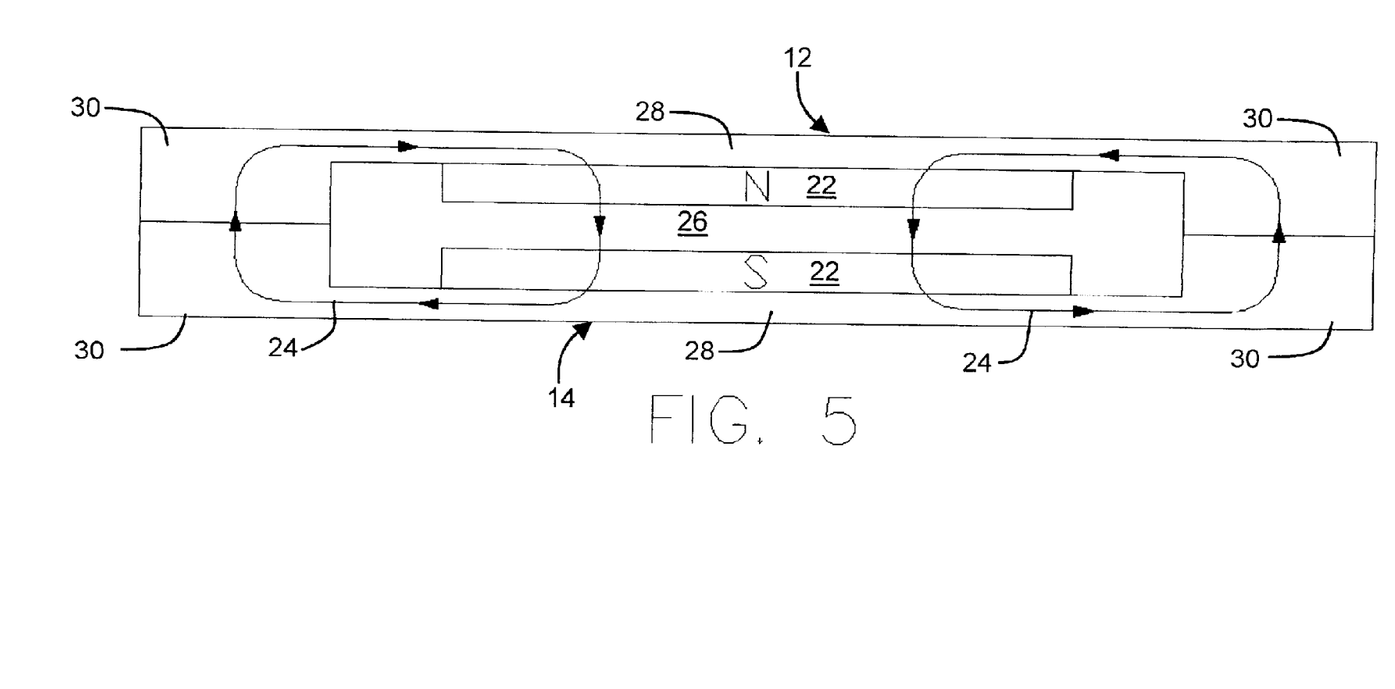
FIG. 5 is a simplified cross-section of the actuator taken along lines 5—5 of FIG. 1 illustrating the salient magnetic path for the magnetic flux as provided by the present invention in a direction perpendicular to the direction of motion shown in FIG. 1.

2) According to the above U.S. Pat. No. 4,808,955, magnetic flux paths are located sequentially along the direction of motion (which extends between the two end plates 208 and 210, in FIG. 7 of the 4,808,955 patent). According to the subject application, there is another, additional or principal path 24 for magnetic flux for each pair of the magnets of opposite polarity that are separated by the air gap 26. In FIG. 5, this other magnetic path 24 for the magnetic flux is depicted by the arrowed paths 24 in the cross-section of the actuator (coil is not shown for simplicity) that is taken perpendicular to direction of motion 19 (which is into or out of the page in FIG. 5).

This above described approach of the subject application results in a design which minimizes the thickness of the field blanks 28 and thereby minimizes the actuator height.

In another embodiment of the invention, only one of the field subassemblies, 12 or 14, needs to have any magnets. In this embodiment, the permanent magnets would be positioned on only one side of the coils 20.

Therefore, one embodiment of the invention is directed to a linear voice coil actuator including a plurality of field subassemblies, and a coil assembly. The plurality of field subassemblies each comprise a field blank, and at least one of the plurality of field subassemblies also includes a plurality of magnets of alternating polarity and of the same or different widths in the direction of motion, wherein the magnets may be spaced apart or in contact with one another and are positioned on the field blank to form interleaved-magnetic circuits in a direction of motion of the linear voice coil actuator. The plurality of field subassemblies are positioned with respect to one another to form a gap between the at least one of the plurality of field subassemblies which includes the plurality of magnets, and another of the plurality of field subassemblies. The coil assembly of this embodiment includes coils that are positioned in the same plane within the gap, wherein the plane is substantially parallel to the direction of motion of the linear voice coil actuator.

Another embodiment of the present invention is directed to a linear voice coil actuator including a plurality of field subassemblies, and a coil assembly. The plurality of field subassemblies each comprise a field blank, and at least one of the plurality of field subassemblies also includes a plurality of magnets of alternating polarity and of the same or different widths in the direction of motion, wherein the magnets may be spaced apart or in contact with one another and are positioned on the field blank to form interleaved-magnetic circuits in a direction of motion of the linear voice coil actuator. The plurality of field subassemblies are positioned with respect to one another to form a gap between the at least one of the plurality of field subassemblies which includes the plurality of magnets, and another of the plurality of field subassemblies. The field blanks in this embodiment further include flux path sections 30 which provide a flux path perpendicular to the direction of motion for each pair of magnets of opposite polarity that are separated by the gap.

In a further embodiment of the above linear voice coil actuator, the field blanks of each of the plurality of field subassemblies comprise a generally planar portion, and the flux path sections extend above the planar portion and along the direction of motion. When a first one of the plurality of field subassemblies and a second one of the plurality of field subassemblies are positioned to form the gap, the flux path sections of the first and second field subassemblies are positioned in contact with or adjacent one another. The provided perpendicular flux path is formed through a magnet of the first field subassembly, across the gap to a magnet of opposite polarity (if any) of the second field subassembly, through the planar portion and then one of the flux path sections of the field blank of the second field subassembly, through the adjacent flux path section and then the planar portion of the first field subassembly, and back to the magnet of the first field subassembly.

Referring to FIG. 1, the illustrated embodiment of a linear voice coil actuator 10 in accordance with the present invention will now be described in greater detail. The linear voice coil actuator includes a first field subassembly 12 and a second field subassembly 14 which are juxtaposed one another. Positioned between field subassemblies 12 and 14 is a coil assembly 16 that moves along a direction of motion 19. Also shown in FIG. 1, positioned in slots 40 and 42 formed in a portion of the coil assembly 16, is a position sensor 18 and wires 44 for communicating with position sensor 18, as well as wires 46 for communicating with the coils of the coil assembly 16. As can be seen from FIG. 1, field subassemblies 12 and 14 have an exterior portion which is generally rectangular in shape, with opposing edges which are shaped to provide an apertures 48 for movement of coil assembly 16 relative to the field subassemblies 12 and 14. Linear bearings or slides (not shown) can be positioned in apertures 48 to support movement of the coil assembly 16.

FIG. 2 provides an illustration of the interior portions of field subassemblies 12 and 14, each of which includes a field blank 28 and permanent magnets 22. The permanent magnets 22 are positioned in a recessed area formed in the interior face of the field blank 28. Formed on the inwardly facing portion of field blank 28, along the field blank edges which are parallel to the direction of motion of the coil assembly 16, are flux path sections 30. When field subassemblies 12 and 14 are coupled together, these flux path sections 30 provide a flux path 24 (illustrated in FIG. 5) perpendicular to the direction of motion 19 of the linear actuator.

As can also be seen from FIG. 2, the thickness of the field blanks 28 flux path sections 30 is greater than that along the edges which are transverse to the direction of motion 19 of the linear actuator. This results in the formation of apertures 48 when the field subassemblies 12 and 14 are assembled together.

It is to be noted that in the embodiment of the linear actuator shown in FIG. 2, both field subassemblies include magnets 22. As explained earlier, other embodiments of the linear actuator of the present invention can employ magnets 22 in only one of the field subassemblies. It is also to be noted that the magnets 22 are positioned in a row in each of field subassemblies 12 and 14 to have alternating polarities to form interleaved-magnetic circuits in the direction of motion of the linear voice coil actuator. In field subassembly 12, the polarity sequence is N-S-N. In field subassembly 14, the polarity sequence is S-N-S. In this manner, when field subassemblies are assembled together, a gap is formed between the magnets of field subassembly 12 and the magnets of field subassembly 14 (see gap 26 in FIG. 5) and magnets of opposite polarity are paired across the gap. Thus, starting at the back of the field subassemblies as illustrated in FIG. 2, a magnet 22 of "N" polarity from field subassembly 12 is paired with a magnet of "S" polarity from field subassembly 14; then a magnet of "S" polarity is paired with a magnet of "N" polarity; and finally a magnet of "N" polarity from field subassembly 12 is paired with a magnet of "S" polarity, all across gap 26.

From FIG. 2 it can be seen that the magnets 22 of this embodiment have different widths. Of the three magnets 22 in field subassembly 12, the center magnet has the largest width. The same is true for the center magnet of the three magnets of field subassembly 14.

As will be appreciated by those skilled in the art in view of the described embodiments, while each of the magnets in each of the field subassemblies is shown to be touching a neighboring magnet, it is contemplated that these magnets may also be spaced apart from one another within the scope of the present invention. It will also be appreciated by one skilled in the art that the width ratios between the magnets illustrated in the figures are but one embodiment of the present invention, and that other ratios may be selected depending upon the force-stroke profile desired for the actuator. Further, while three magnets 22 are shown in a row in each field subassembly, other numbers of magnets can be used to form the interleaved-magnetic circuits of the present invention, as will be appreciated by those skilled in the art.

Referring now to FIG. 3, the coil assembly 16 of the linear actuator 10 will be described in greater detail. Coil assembly 16 includes a support structure 50 having a coil supporting section 50 and support extensions 52 and 54 formed at opposite ends of the coil supporting section 50. Slots 40 and 42 are formed in support extension 52 for routing wires 44 and 46 to position sensor 18 and to coils 20, respectively. Coils 20 are planar in shape and preferably are positioned in a recessed area 56 formed in supporting section 50. As can be seen from FIG. 3, the thickness of planar coils 20 is approximately equal to the depth of the recessed area 56. Coils 20 can be bonded to support structure 50 or completely encapsulated within recessed area 56.

FIG. 4 is an exploded view of linear actuator 10, illustrating the relative position of coils 20 with respect to magnets 22. In the embodiment of FIG. 4, each field subassembly 12 and 14 has a trio of magnets 22 of alternating polarity. The center magnet 22 of each trio of magnets has a width greater than the two magnets to either side. The coil assembly 16 has two coils 20 of similar widths. In the embodiment of FIG. 4, the widths of coils 20 are similar to the width of the center magnet of the trio of magnets.

Referring now to FIG. 5, a cross section of the linear actuator is shown taken along lines 5—5 of FIG. 1. Thus, FIG. 5 shows a cross section which is transverse to the direction of motion 19 of the linear actuator 10. As can be seen from the figure, in this cross sectional point of linear actuator 10 the polarity of the magnet 22 of field subassembly 14 is "S" while the polarity of the magnet 22 of field subassembly 12 is "N", so that a pair of magnets of opposite polarities are provided, separated by gap 26 is located between the pair of magnets.

Also to be noted in FIG. 5 is that the flux path sections 30 of the field subassemblies 12 and 14 are positioned with respect to one another to provide flux paths indicated by arrows 24. These flux paths 24 are transverse to the direction of motion of the linear actuator 10. A notable benefit of these flux path sections is that they result in a device with a height that is largely independent of the length of the magnets used. Thus, if the stroke of the actuator were desired to be increased, a commensurate increase in the height of the actuator would not be required, as would typically be the case with conventional actuator structures such as those shown in FIGS. 6 and 7.

As mentioned earlier, in another embodiment of the present invention, only one of the field subassemblies includes magnets 22. The other field subassembly would include a field blank 28 having flux path sections 30, but without the recessed area in the interior face of the field blank 28.

The terms and expressions which have been employed herein are terms of description and not of limitation, and there is no intent in the use of such terms and expressions of excluding equivalents of the features shown and described, or portions thereof, it being recognized that various modifications are possible within the scope of the invention claimed.

What is claimed is:

1. A linear voice coil actuator including
   a plurality of field subassemblies each comprising a field blank, wherein at least a first one of the plurality of field subassemblies includes a plurality of magnets of alternating polarity positioned on the field blank to form interleaved-magnetic circuits in a direction of motion of the linear voice coil actuator, wherein each of the plurality of magnets has opposing ends which are substantially parallel to the direction of motion; and
   further wherein the plurality of field subassemblies are positioned with respect to one another to form a gap between the first one of the plurality of field subassemblies which includes the plurality of magnets, and another of the plurality of field subassemblies, and to provide at the opposing ends of the magnets a transverse flux path through the field blanks in a plane transverse to the direction of motion, and
   a coil assembly that includes coils positioned in a plane within the gap, wherein the plane is substantially parallel to the direction of motion of the linear voice coil actuator;
   and wherein the plurality of magnets are magnetized in directions perpendicular to the direction of motion of the linear voice coil actuator.

2. The linear voice coil actuator of claim 1, wherein the plurality of magnets have the same widths in the direction of motion of the linear voice coil actuator.

3. The linear voice coil actuator of claim 1, wherein the magnets are paced apart with respect to one another.

4. The linear voice coil actuator of claim 1, wherein the plurality of magnets have different widths in the direction of motion of the linear voice coil actuator.

5. The linear voice coil actuator of claim 1, wherein the plurality of magnets are in contact with one another.

6. The linear voice coil actuator of claim 1, wherein the field blanks further include flux path sections positioned to provide, for each of the plurality of magnets of the first one of the plurality of field subassemblies and a corresponding portion of a field blank of another one of the plurality of field subassemblies positioned across the gap from the magnet, a the transverse flux path through the field blanks in the plane transverse to the direction of motion of the linear voice coil actuator.

7. The linear voice coil actuator of claim 1, wherein a second one of the plurality of field subassemblies includes a plurality of magnets of alternating polarity positioned on the field blank to form interleaved-magnetic circuits in a direction of motion of the linear voice coil actuator, so that pairs of magnets of opposite polarity from the first and second ones of the plurality of subassemblies are separated by the gap, and further wherein the field blanks further include flux path sections positioned to provide, for each of the pairs of magnets of opposite polarity that are separated by the gap, the transverse flux path through the field blanks in the plane transverse to the direction of motion of the linear voice coil actuator.

8. The linear voice coil actuator of claim 6, wherein each of the field blanks comprise a generally planar portion, and the flux path sections extend beyond the planar portion and along the planar portion in the direction of motion of the linear voice coil actuator, and wherein the flux path sections of the first one and the another one of the plurality of field subassemblies are positioned in contact with or adjacent one another, so that the transverse flux path is formed through a magnet of the first one of the plurality of field subassemblies, across the gap to a corresponding portion of the another one of the plurality of field subassemblies, through the planar portion of the another one of the plurality of field subassemblies, through one of the flux path sections of the field blank of the another one of the plurality of field subassemblies, through the adjacent flux path section and then through the planar portion of the first one of the plurality of field subassemblies, and back to the magnet of the first one of the plurality of field subassemblies.

9. The linear voice coil actuator of claim 7, wherein each of the field blanks comprise a generally planar portion, and the flux path sections extend in the direction of motion of the linear voice coil actuator along the planar portion and beyond the planar portion and, and wherein the flux path sections of the first and second ones of the plurality of field subassemblies are positioned in contact with or adjacent one another, so that the transverse flux path is formed through a magnet of the first one of the plurality of field subassemblies, across the gap to a magnet of opposite polarity of the second one of the plurality of field subassemblies, through the planar portion of the second one of the plurality of field subassemblies, through one of the flux path sections of the field blank of the second one of the plurality of field subassemblies, through the adjacent flux path section and then the planar portion of the first one of the plurality of field subassemblies, and back to the magnet of the first one of the plurality of field subassemblies.

10. A linear voice coil actuator including
a plurality of field subassemblies each comprising a field blank, wherein at least a first one of the plurality of field subassemblies includes a plurality of magnets of alternating polarity positioned on the field blank to form interleaved-magnetic circuits in a direction of motion of the linear voice coil actuator, wherein each of the plurality of magnets has opposing ends which are substantially parallel to the direction of motion; and wherein the plurality of magnets have the same widths and are in contact with one another in the direction of motion of the linear voice coil actuator, and are magnetized in directions perpendicular to the direction of motion, and further wherein the plurality of field subassemblies are positioned with respect to one another to form a gap between the first one of the plurality of field subassemblies, and another of the plurality of field subassemblies, and to provide at the opposing ends of the magnets a transverse flux path through the field blanks in a plane transverse to the direction of motion of the linear voice coil actuator, and
a coil assembly that includes coils positioned in a plane within the gap, wherein the plane is substantially parallel to the direction of motion of the linear voice coil actuator.

11. A linear voice coil actuator including
a plurality of field subassemblies each comprising a field blank, wherein at least a first one of the plurality of field subassemblies includes a plurality of magnets of alternating polarity positioned on the field blank to form interleaved-magnetic circuits in a direction of motion of the linear voice coil actuator, wherein each of the plurality of magnets has opposing ends which are substantially parallel to the direction of motion; and wherein the plurality of magnets have different widths and are spaced apart from one another in the direction of motion of the linear voice coil actuator, and are magnetized in directions perpendicular to the direction of motion, and further wherein the plurality of field subassemblies are positioned with respect to one another to form a gap between the first one of the plurality of field subassemblies, and another of the plurality of field subassemblies, and to provide at the opposing ends of the magnets a transverse flux path through the field blanks in a plane transverse to the direction of motion of the linear voice coil actuator, and
a coil assembly that includes coils positioned in a plane within the gap, wherein the plane is substantially parallel to the direction of motion of the linear voice coil actuator.

12. The linear voice coil actuator of claim 10, wherein the Field blanks further include flux path sections positioned to provide, for each of the magnets of the first one of the plurality of field subassemblies and a corresponding portion of a field blank of another one of the plurality of field subassemblies positioned across the gap from the magnet, the transverse flux path through the field blanks in the plane transverse to the direction of motion of the linear voice coil actuator.

13. The linear voice coil actuator of claim 10, wherein a second one of the plurality of field subassemblies includes a plurality of magnets of alternating polarity positioned on the field blank to form interleaved-magnetic circuits in a direction of motion of the linear voice coil actuator, so that pairs of magnets of opposite polarity from the first and second ones of the plurality of subassemblies are separated by the gap, and further wherein the field blanks further include flux path sections positioned to provide, for each of the pairs of magnets of opposite polarity that are separated by the gap, a the transverse flux path through the field blanks in the plane transverse to the direction of motion of the linear voice coil actuator.

14. The linear voice coil actuator of claim 12, wherein each of the field blanks comprise a generally planar portion, and the flux path sections extend beyond the planar portion and along the planar portion in the direction of motion of the linear voice coil actuator, and wherein the flux path sections of the first and the another ones of the plurality of field subassemblies are positioned in contact with or adjacent one another, so that the transverse flux path is formed through a magnet of the first one of the plurality of field subassemblies, across the gap to corresponding portion of the another one of the plurality of field subassemblies, through the planar portion of the another one of the plurality of field subassemblies, through one of the flux path sections of the field blank of the another one of the plurality of field subassemblies, through the adjacent flux path section and then the planar portion of the first one of the plurality of field subassemblies, and back to the magnet of the first one of the plurality of field subassemblies.

15. The linear voice coil actuator of claim 13, wherein each of the field blanks comprise a generally planar portion, and the flux path sections extend beyond the planar portion and along the planar portion in the direction of motion of the linear voice coil actuator, and wherein the flux path sections of the first and second ones of the plurality of field subassemblies are positioned in contact with or adjacent one another, so that the transverse flux path is formed through a magnet of the first one of the plurality of field subassemblies, across the gap to a magnet of opposite polarity of the second one of the plurality of field subassemblies, through the planar portion of the second one of the plurality of field subassemblies, through one of the flux path sections of the field blank of the second one of the plurality of field subassemblies, through the adjacent flux path section and then the planar portion of the first one of the plurality of field subassemblies, and back to the magnet of the first one of the plurality of field subassemblies.

16. The linear voice coil actuator of claim 11, wherein the field blanks further include flux path sections positioned to provide, for each of the magnets of the first one of the plurality of field subassemblies and a corresponding portion of a field blank of another one of the plurality of field subassemblies positioned across the gap from the magnet, the transverse flux path through the field blanks in the plane transverse to the direction of motion of the linear voice coil actuator.

17. The linear voice coil actuator of claim 11, wherein a second one of the plurality of field subassemblies includes a plurality of magnets of alternating polarity positioned on the field blank to form interleaved-magnetic circuits in a direction of motion of the linear voice coil actuator, so that pairs of magnets of opposite polarity from the first and second ones of the plurality of field subassemblies are separated by the gap, and further wherein the field blanks further include flux path sections positioned to provide, for each of the pairs of magnets of opposite polarity that are separated by the gap, a the transverse flux path through the field blanks in the plane transverse to the direction of motion of the linear voice coil actuator.

18. The linear voice coil actuator of claim 16, wherein each of the field blanks comprise a generally planar portion, and the flux path sections extend beyond the planar portion and along the planar portion in the direction of motion of the linear voice coil actuator, and wherein the flux path sections of the first and the another ones of the plurality of field subassemblies are positioned in contact with or adjacent one another, so that the transverse flux path is formed through a magnet of the first one of the plurality of field subassemblies, across the gap to corresponding portion of the another one of the plurality of field subassemblies, through the planar portion of the another one of the plurality of field subassemblies, through one of the flux path sections of the field blank of the another one of the plurality of field subassemblies, through the adjacent flux path section and then the planar portion of the first one of the plurality of field subassemblies, and back to the magnet of the first one of the plurality of field subassemblies.

19. The linear voice coil actuator of claim 17, wherein each of the field blanks comprise a generally planar portion, and the flux path sections extend beyond the planar portion and along the planar portion in the direction of motion of the linear voice coil actuator, and wherein the flux path sections of the first and second ones of the plurality of field subassemblies are positioned in contact with or adjacent one another, so that the transverse flux path is formed through a magnet of the first one of the plurality of field subassemblies, across the gap to a magnet of opposite polarity of the second one of the plurality of field subassemblies, through the planar portion of the second one of the plurality of field subassemblies, through one of the flux path sections of the field blank of the second one of the plurality of field subassemblies, through the adjacent flux path section and then the planar portion of the first one of the plurality of field subassemblies, and back to the magnet of the first one of the plurality of field subassemblies.

20. A linear voice coil actuator including
   a plurality of field subassemblies each comprising a field blank, wherein at least a first one of the plurality of field subassemblies includes a plurality of magnets of alternating polarity positioned on the field blank to form interleaved-magnetic circuits in a direction of motion of the linear voice coil actuator, wherein each of the plurality of magnets has opposing ends which are substantially parallel to the direction of motion, and the plurality of magnets are magnetized in directions perpendicular to the direction of motion; and further wherein the plurality of field subassemblies are positioned with respect to one another to form a gap between the first one of the plurality of field subassemblies which includes the plurality of magnets, and another of the plurality of field subassemblies, and so that a transverse flux path through the field blanks at the opposing ends of the magnets is provided in a plane transverse to the direction of motion of the linear voice coil actuator, and
   a coil assembly that includes coils positioned in a plane within the gap, wherein the plane is substantially parallel to the direction of motion of the linear voice coil actuator,
   wherein the field blanks include flux path sections positioned to provide, for each of the plurality of magnets of the first one of the plurality of field subassemblies and a corresponding portion of a field blank of another one of the plurality of field subassemblies positioned across the gap from the magnet, the transverse flux path through the field blanks in the plane transverse to the direction of motion of the linear voice coil actuator.

* * * * *